(12) United States Patent
Geduldig

(10) Patent No.: US 10,419,826 B2
(45) Date of Patent: Sep. 17, 2019

(54) USING A WEBPAGE TO INSERT GRAPHICAL ELEMENTS INTO A VIDEO PROGRAM STREAM

(71) Applicant: Disney Enterprises, Inc., Burbank, CA (US)

(72) Inventor: Jonas Geduldig, Glen Rock, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/261,478

(22) Filed: Sep. 9, 2016

(65) Prior Publication Data

US 2018/0077469 A1  Mar. 15, 2018

(51) Int. Cl.
*H04N 21/81* (2011.01)
*H04N 21/234* (2011.01)
*H04N 21/431* (2011.01)
*H04N 21/858* (2011.01)

(52) U.S. Cl.
CPC ... *H04N 21/8146* (2013.01); *H04N 21/23424* (2013.01); *H04N 21/4312* (2013.01); *H04N 21/8126* (2013.01); *H04N 21/8586* (2013.01)

(58) Field of Classification Search
CPC ......... H04N 21/8146; H04N 21/23424; H04N 21/4312; H04N 21/8586; H04N 21/8126
See application file for complete search history.

(56) References Cited

U.S. PATENT DOCUMENTS

| | | | |
|---|---|---|---|
| 6,229,550 B1 * | 5/2001 | Gloudemans | H04N 5/272 345/641 |
| 7,979,877 B2 | 7/2011 | Huber et al. | |
| 2002/0056136 A1 * | 5/2002 | Wistendahl | G06F 17/30017 725/135 |
| 2006/0259588 A1 * | 11/2006 | Lerman | G06F 17/30017 709/219 |
| 2007/0168060 A1 | 7/2007 | Nixon et al. | |
| 2007/0277108 A1 | 11/2007 | Orgill et al. | |
| 2012/0308211 A1 | 12/2012 | Xu et al. | |

(Continued)

FOREIGN PATENT DOCUMENTS

WO   2015071490 A1   5/2015

OTHER PUBLICATIONS

Ojala, "PixelConduit User's Guide," Chapter 5, http://pixelconduit.com/PixelConduit%20Guide%20Chapter5.pdf, 2013, 28 pages.

*Primary Examiner* — Yassin Alata
(74) *Attorney, Agent, or Firm* — Patterson + Sheridan, LLP

(57) ABSTRACT

Embodiments herein describe a system for generating graphics for overlaying a video stream of a media presentation. In one embodiment, the system uses a webpage hosted on a web server to generate the graphics for overlaying the media presentation. To convert the webpage into graphics which can overlay the media presentation, a graphics generator renders the data defining the webpage into a graphic that can be displayed. The graphics generator uses the rendered webpage to generate a video stream (referred to herein as an overlay video stream) which is transmitted to a keyer along with a transparency key. The keyer combines the overlay video stream generated from the webpage with the video stream of the media presentation using the transparency key, thereby inserting the graphics of the webpage into the media presentation.

20 Claims, 5 Drawing Sheets

(56) References Cited

U.S. PATENT DOCUMENTS

2013/0031160 A1    1/2013   Carmichael
2013/0272679 A1   10/2013   Cavalcanti
2014/0359060 A1   12/2014   Lucas et al.
2015/0088977 A1    3/2015   Monesson

* cited by examiner

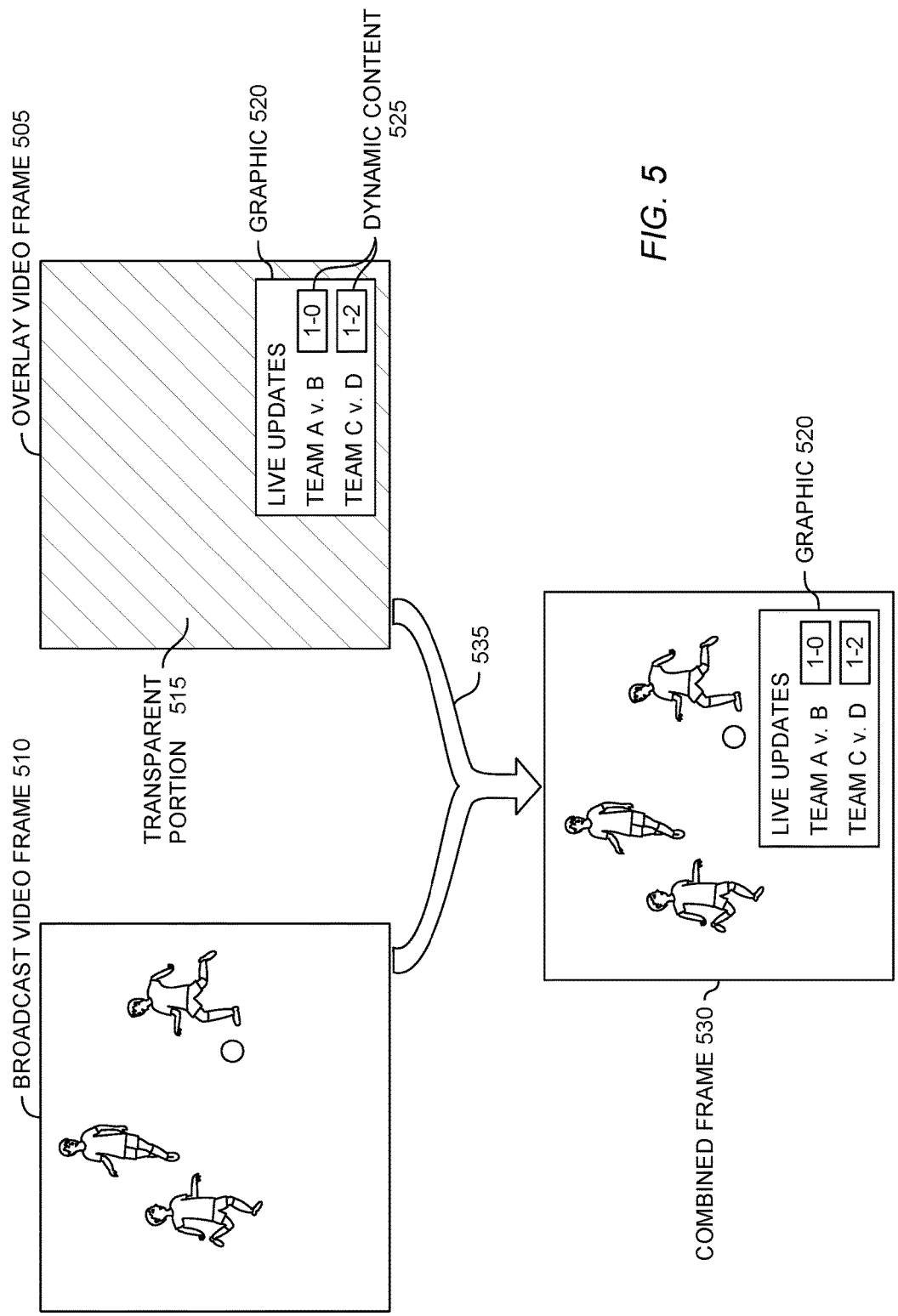

USING A WEBPAGE TO INSERT GRAPHICAL ELEMENTS INTO A VIDEO PROGRAM STREAM

BACKGROUND

Field of the Invention

The embodiments herein are generally directed to generating graphics for overlaying a media presentation.

Description of the Related Art

Before broadcasting a media presentation, some content providers generate graphical elements that are overlaid on the media presentation. These graphical elements may include images or animations that promote other shows or advertise specific products. In another example, the graphical elements may include a scoreboard which provides real-time updates that reflect current scores in a sporting event.

Current applications require pre-built graphic templates that are pre-loaded onto a graphics generating device. However, generating the graphics from the templates is complex and expensive. For example, the applications typically have complex ecosystems that require special training in order to generate the graphics.

SUMMARY

One embodiment described herein is a method for receiving a webpage via a communication network, the webpage comprising at least one graphic to be overlaid on a video stream of a media presentation. The method also includes rendering the webpage into a displayable image comprising the at least one graphic and generating an overlay video stream using the displayable image. The method includes generating a transparency key where the transparency key defines transparency values indicating an opacity of pixels in the overlay video stream when overlaid on corresponding pixels in the video stream of the media presentation.

Another embodiment described herein is a system that includes one or more computing processors and a memory comprising a program that when executed by the one or more computer processors performs an operation that includes receiving a webpage via a communication network, the webpage comprising at least one graphic to be overlaid on a video stream of a media presentation. The operation also includes rendering the webpage into a displayable image comprising the at least one graphic and generating an overlay video stream using the displayable image. The operation includes generating a transparency key where the transparency key defines transparency values indicating an opacity of pixels in the overlay video stream when overlaid on corresponding pixels in the video stream of the media presentation.

Another embodiment described herein is a non-transitory computer readable storage medium that includes computer-readable program code for verifying a media presentation, where, when executed by a computing processor, the computer-readable program code performs an operation that includes receiving a webpage via a communication network, the webpage comprising at least one graphic to be overlaid on a video stream of the media presentation. The operation includes rendering the webpage into a displayable image comprising the at least one graphic and generating an overlay video stream using the displayable image. The operation includes generating a transparency key where the transparency key defines transparency values indicating an opacity of pixels in the overlay video stream when overlaid corresponding pixels in the video stream of the media presentation.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 5 illustrates overlaying a frame of a broadcast video stream with a frame of a graphics video stream, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
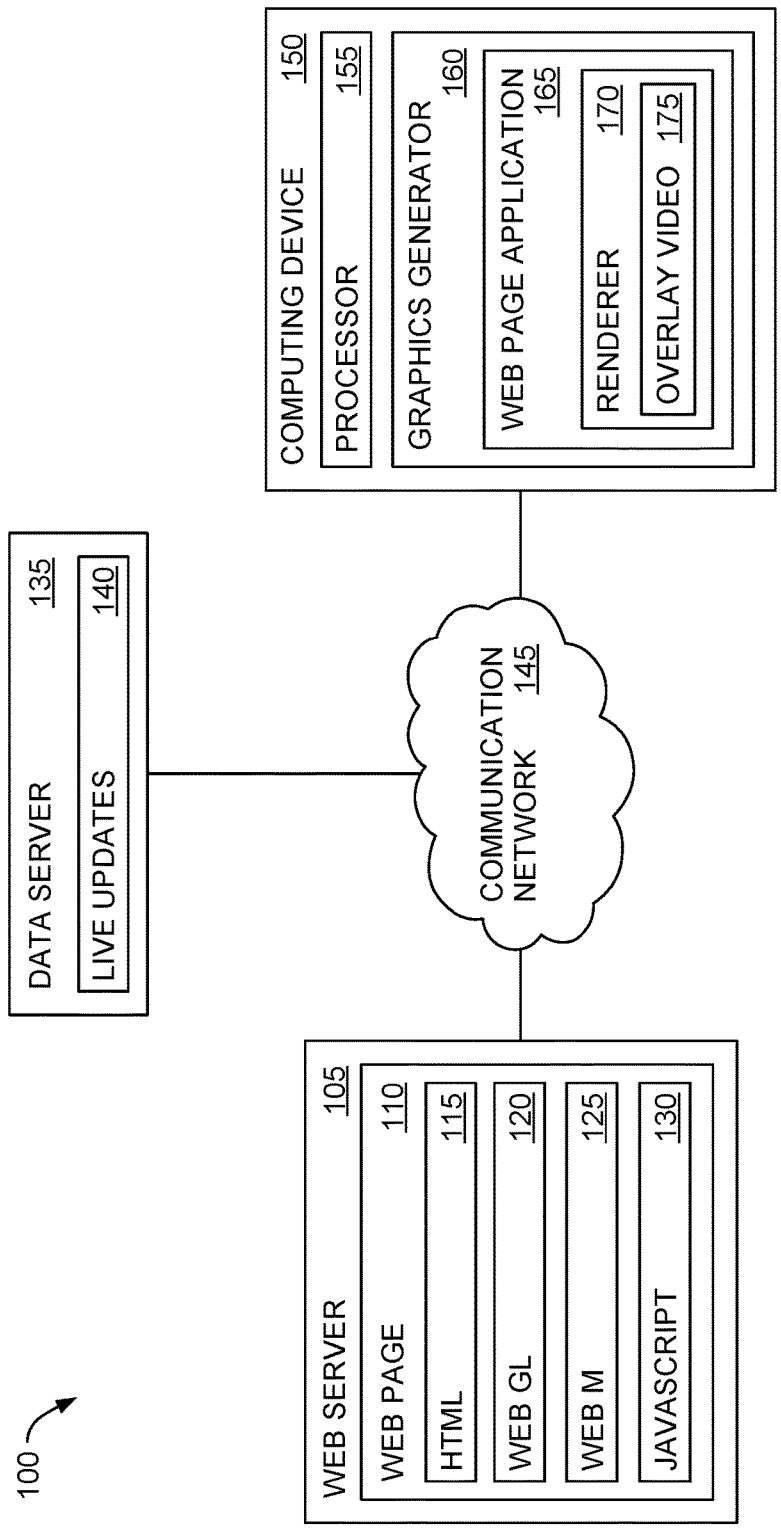
FIG. 1 illustrates a system for generating graphics that are overlaid on a media presentation, according to one embodiment described herein.

Embodiments herein describe a system for generating graphics for overlaying a video stream of a media presentation (e.g., a television sitcom, a movie, a live sporting event, a live news broadcast, etc.). As described above, the graphics may include a scoreboard with live scores or promotional content (e.g., a snipe) that advertises an upcoming show. In one embodiment, the system uses a webpage hosted on a web server to generate the graphics that are overlaid the media presentation. That is, instead of using a special (and expensive) application designed for generating the overlay graphics, tools for generating webpages (e.g., HTML, JavaScript®, WebGL, WebM, etc.) can be leveraged to generate the overlay graphics. Because of the proliferation of these tools, many web designers have the requisite skills for designing the desired overlay graphics in the form of a webpage.

To convert the webpage into graphics which can overlay a media presentation, a graphics generator establishes a connection to the web server hosting the webpage and receives the data defining the webpage which may contain HTML, JavaScript, WebGL data, and the like. Using a web-page application (e.g., a browser), the graphics generator converts the data defining the webpage into a graphic that can be displayed. Put differently, the graphics generator renders the webpage into a displayable image that contains the graphic. However, instead of transmitting the displayable image to a display adapter (e.g., a video card), the graphics generator uses the image to generate a video stream (referred to herein as an overlay video stream) which is transmitted to a keyer. In response to a user command, the keyer combines the overlay video stream derived from the webpage with the video stream of the media presentation, thereby inserting the graphics of the webpage into the media presentation.

In one embodiment, the dimensions of the webpage are the same or substantially similar to the dimensions of the media presentation—e.g., each pixel in the webpage corresponds to a respective pixel in the media presentation. When generating the overlay video stream, the graphics generator provides a transparency key that indicates the transparency of each pixel in the webpage. The keyer can use the transparency key to identify the portions of the overlay video stream that are completely transparent (i.e., that should not block the underlying pixels in the media presentation) and the pixels in the overlay video stream that do (at least partially) block the corresponding pixels in the media presentation. For example, if the webpage contains a scoreboard, the graphics generator may assign all the pixels in the webpage that do not include the scoreboard a high transparency value (i.e., the pixels are see through) but a low transparency value for the pixels in the webpage that are part of the scoreboard. Thus, when combined with the pixels of the media presentation, only the pixels forming the scoreboard cover up, or occlude, the pixels of the media presentation while the remaining portion of the webpage does not affect the media presentation.

FIG. 1 illustrates a system 100 for generating graphics that are overlaid on a media presentation, according to one embodiment described herein. The system 100 includes a web server 105, a data server 135, and a computing device 150 for generating an overlay video 175 that includes graphics that can be overlaid a video of a media presentation. As shown, the web server 105 stores a webpage 110 that defines data that, when rendered, illustrates graphics that can be used to overlay the media presentation. For example, the webpage 110 may include HTML 115, WebGL 120, WebM 125, JavaScript 130, and any other data generated using web-based protocols or programming languages that that can be used to create webpages. Put differently, any current or future tool or programming language that can be used to generate a webpage can be leveraged to generate the graphics that form the overlay video 175. For example, WebGL 120 is a JavaScript application programming interface (API) for rendering interactive 3D computer graphics and 2D graphics in a web browser while WebM is an open media file format designed for the web. Instead of using these web tools to generate a webpage for rendering using a browser, the embodiments herein use these tools to generate the webpage 110 which can include 2D graphics, 3D graphics, or animations that are overlaid a media presentation.

In one embodiment, a web designer uses HTML 115, WebGL 120, WebM 125, and JavaScript 130 (or any other web-based tool or programming language) individually or in combination to generate the data defining the webpage 110. For example, the web designer can use these tools to generate a webpage 110 that includes graphics such as a live scoreboard or a snipe promoting an upcoming show. In one embodiment, a location of the webpage 110 on the web server 105 is defined by a unique pointer such as a URL.

The data server 135 includes live updates 140 which are used to update the graphics in the webpage 110. For example, the webpage 110 may include a link to the data server 135 which permits the web server 105 to receive the live updates 140 and update the graphics in the webpage 110. For example, if the webpage 110 includes a scoreboard, the live updates 140 may list the current teams playing and the current scores. In one embodiment, the webpage 110 includes JavaScript 130 which changes the data of the webpage 110 depending on the information contained in the live updates 140. Thus, the content in the webpage 110 can change dynamically according to the live updates 140 provided by the data server 135 without user input.

The computing device 150 includes a processor 155 and a graphics generator 160. The processor 155 represents any number of individual processing elements that each may include one or more processing cores. The graphics generator 160 can be a software application stored in memory in the computing device 150 or may include both software and hardware elements. The graphics generator 160 includes a webpage application 165 that can render the webpage 110 received from the web server 105. For example, the webpage application 165 may be similar to a web browser in that the application 165 can interpret or convert the data defining the webpage 110 (which may include HTML 115, WebGL 120, WebM 125, and/or JavaScript 130) into one or more visual graphics or animations. In this example, the webpage application 165 includes a renderer 170 that renders the webpage 110 into a displayable image that includes the graphics. In this manner, the webpage application 165 is compatible with the various web-based tools used to generate a webpage so that the renderer 170 can convert the graphics into a format that can be displayed on a display device.

However, unlike a web browser where the rendered webpage 110 (i.e., the displayable image) is transmitted to a display adapter, the webpage application 165 does not need to display the visual graphics in the webpage 110 using computing device 150. In one embodiment, the webpage application 165 stores the data representing the rendered webpage into a data buffer. Using this stored data, the renderer 170 can generate the overlay video 175. For example, the renderer 170 can output the stored displayable image at a predefined frame rate (e.g., 60 frames per second) to generate the overlay video 175. As the content in the webpage 110 changes (e.g., due to a change made by a web designer or from the live updates 140), the renderer 170 can generate a new version of the rendered webpage 110 which is then used to generate the overlay video 175.

The system 100 includes a communication network 145 that facilitates communication between the web server 105, the data server 135, and the computing device 150. In one embodiment, the communication network 145 may be an internal network (such as an intranet or local area network (LAN)) of a content provider. Thus, only computing devices that are coupled or authorized to use the internal network can access the webpage 110 and live updates 140. Alternatively, the communication network 145 may be a public network such as the Internet where the webpage 110 can be freely accessed.

Figure 2:
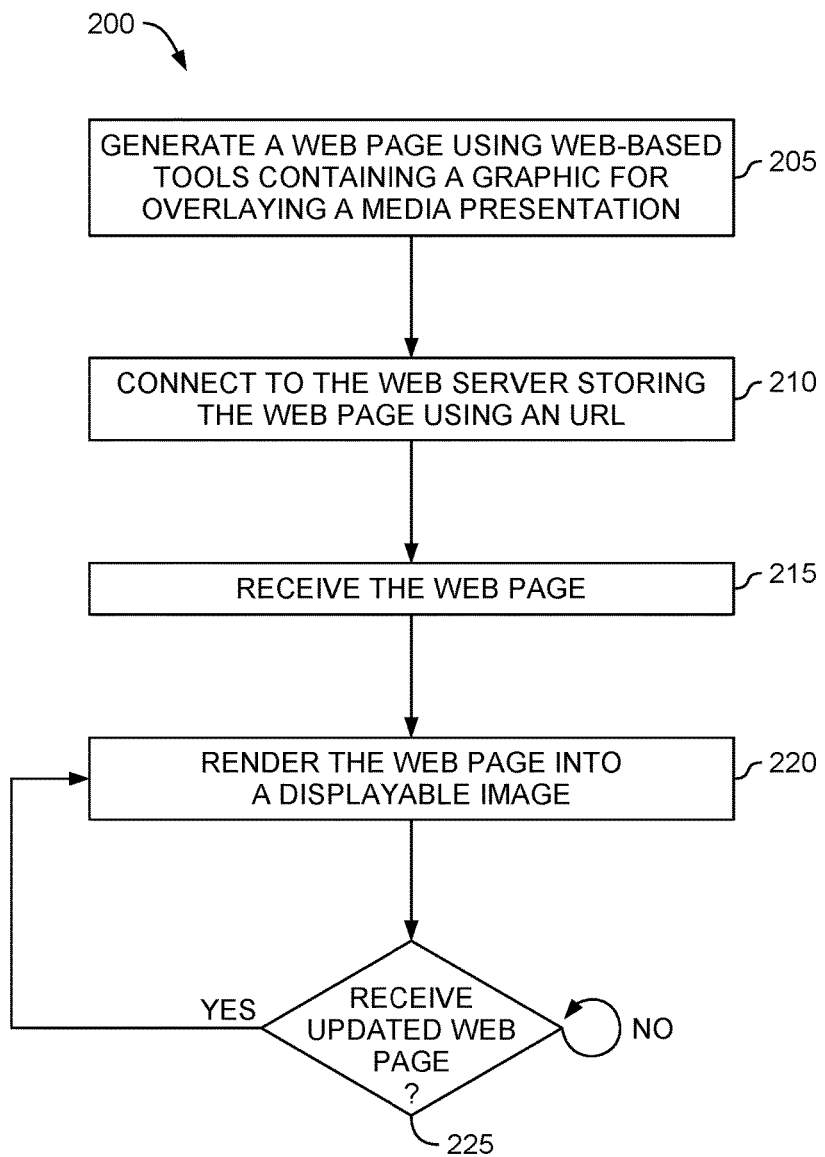
FIG. 2 is a flowchart for generating graphics that are overlaid on a media presentation, according to one embodiment described herein.

FIG. 2 is a flowchart of a method 200 for generating graphics that are overlaid on a media presentation, according to one embodiment described herein. At block 205, a web designer generates a webpage (e.g., webpage 110 in FIG. 1) using web-based tools where the webpage contains a graphic for a media presentation. In one embodiment, the web designer may design the webpage specifically for the media presentation. For example, the webpage may have the same dimensions (length and width) as the dimensions of media presentation. In one embodiment, the number and arrangement of the pixels in the webpage may be the same as the number and arrangement of pixels in the media presentation. Doing so enables the web designer to place the graphics in the webpage in a location that directly corresponds to a location in the media presentation. For example, if the web designer wants a promotional advertisement to be centered in the lower third of the media presentation, the web designer places the graphics of the promotional advertisement in the center of the lower third of the webpage. Thus, when the webpage is superimposed onto the media presentation, the promotional advertisement is at the desired location.

The webpage is not limited to static graphics but can also include animations (e.g., a series of different graphics) that move over time in the media presentation. For example, the webpage may include a 3D graphic of a football player kicking a ball to promote a live sporting event that follows the current media presentation. Moreover, the webpage may include multiple graphics at different, non-contiguous locations. In one example, a scoreboard may be disposed in the lower third of the webpage while a logo of the content provider is disposed in the upper left corner of the webpage.

As described above, the web designer can use any current or future web-based tool to generate the graphics in the webpage. By converting the graphics derived from a webpage into a displayable image, a content provider can avoid using a special graphics application which may be complex and require training to generate the overlay graphics. Instead, any web designer that can generate graphics for a webpage can use the same techniques and tools for generating graphics that can be overlaid a media presentation.

At block 210, the graphics generator connects to the web server storing the webpage using a URL. In this example, the graphics generator using the URL (or any other pointer) to identify the desired webpage on the web server. For example, the web server may host multiple webpages that provide different overlay graphics (e.g., a commercial advertising a product, a snipe promoting a show, or a live scoreboard). Using the URL, the graphics generator can identify the webpage that contains the desired overlay graphics.

In one embodiment, the graphics generator establishes the connection only once for the webpage and can receive subsequent updates from the web server using that connection. That is, once a connection is established between the graphics generator and the web server via the communication network, the web server can push to the graphics generator when, e.g., updated information is received from the data server. In this embodiment, the graphics generator maintains a connection to the web server so that updates to the webpage can be received in real-time.

As mentioned above, the webpage may be generated using the same web-based tools used to generate an internet webpage. Thus, if the URL for the webpage was entered into a web browser, in one embodiment, the web browser could render the webpage and display the overlay graphics in the webpage on a display device. However, because the webpage is designed to include graphics that are overlaid a media presentation rather than on a mobile device or a computer monitor, the formatting of the webpage may be different than an internet webpage which is designed to be displayed using a browser.

At block 215, the graphics generator receives the webpage from the web server. The graphics generator may include a webpage application with the necessary tools for converting the data of the webpage (e.g., the HTML and/or JavaScript) into a displayable image that includes the graphic or a portion of an animation. In one embodiment, the webpage application has the same functionality as a web browser that can generate graphics, text, and animations for display using webpage data.

At block 220, the graphics generator renders the webpage into a displayable image (i.e., one or more overlay graphics). For example, the graphics generator may include a renderer that converts the data in the webpage to the overlay graphics. Instead of outputting the displayable image to a display adapter or video card, in one embodiment the renderer stores the displayable image in a buffer which can be used to generate the overlay video stream as described below. However, in one embodiment, the renderer may output the graphics for display which can be viewed by a supervisor who ensures the correct webpage was accessed.

At block 225, the graphics generator determines if updated data for the webpage is received. For instance, if the webpage includes an embedded link to a data server, the data in the webpage can be updated in response to updates provided by the data server. When updates are received, the web server can send the updated webpage to the graphics generator. If the webpage is updated, method 200 returns to block 220 where the new, updated webpage is rendered and stored in a buffer. Otherwise, the graphics generator continues to use the previously rendered webpage data to generate the overlay video stream.

Figure 3:
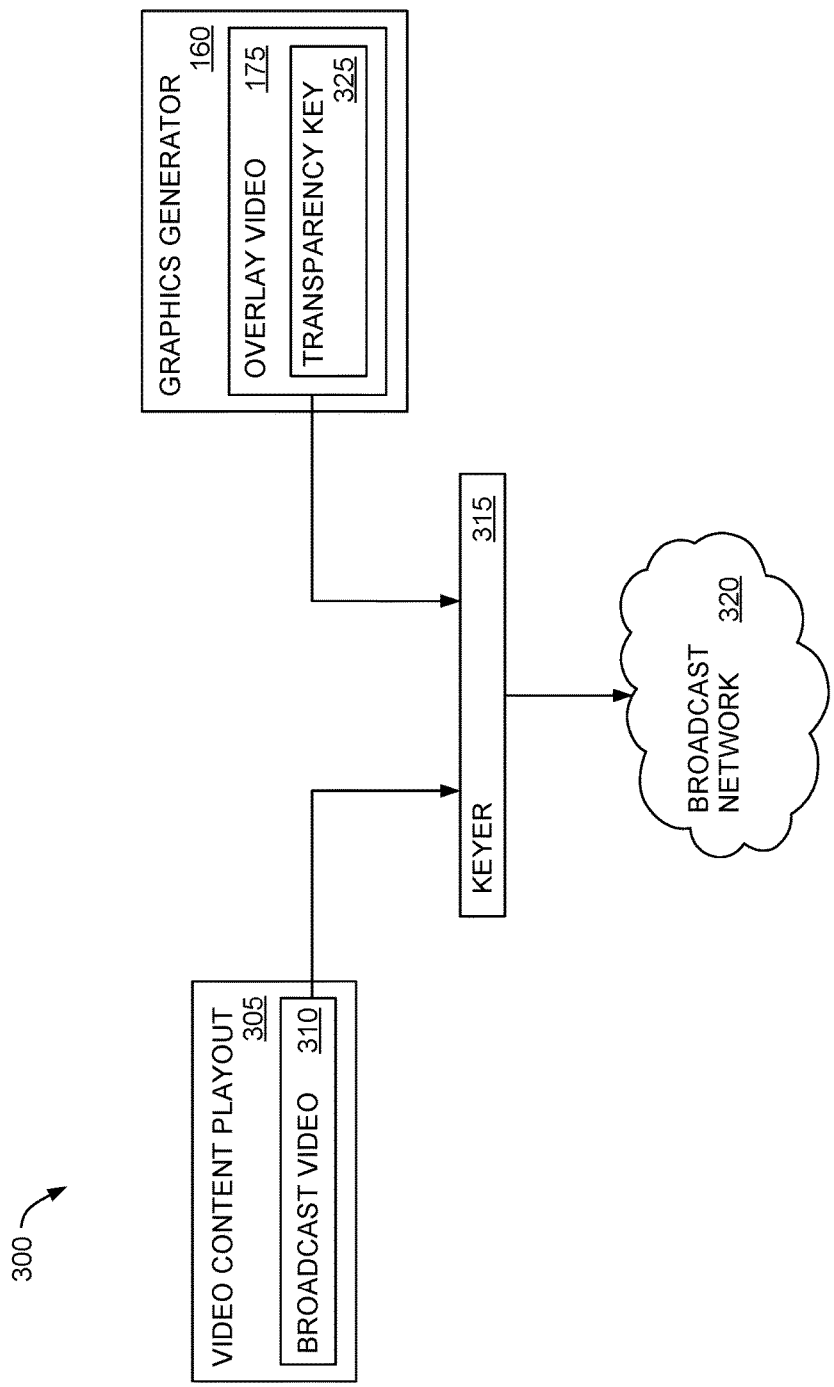
FIG. 3 illustrates a system for overlaying a graphics video stream with a broadcast video stream for a media presentation, according to one embodiment described herein.

FIG. 3 illustrates a system 300 for overlaying a graphics video stream with a broadcast video for a media presentation, according to one embodiment described herein. The system 300 includes the graphics generator 160, a video content playout 305, a keyer 315, and a broadcast network 320. As described above, the graphics generator 160 renders a webpage into a displayable image that can be used to generate the overlay video 175. For example, the displayable image can be stored in a buffer whose output is used to generate individual frames of the overlay video 175. Thus, so long as the webpage is not updated, each frame in the overlay video 175 displays the same graphic. However, if the webpage includes an animation or information (e.g., scores) that are updated dynamically, the frames of the overlay video 175 change as the webpage data is updated.

In one embodiment, the video content playout 305 retrieves content from an asset management system and generates the media presentation according to a broadcast schedule. Generally, the broadcast schedule indicates the specific content that should be broadcast at the various timeslots throughout the day. The video content playout 305 arranges the content according to the broadcast schedule to generate a broadcast video 310 of the media presentation. Although the broadcast schedule may be static, in one embodiment, a scheduling system can dynamically change the broadcast schedule in response to live events—e.g., special broadcasts or new reports. In response to the live event, the scheduling system may transmit an updated schedule to the video content playout 305 which alters the media presentation represented by the broadcast video 310 accordingly.

The broadcast video 310 may include different types of content (e.g., live, program, commercial, or promotional content) or different instances of the same type of content (e.g., two program segments of the same show). In one embodiment, the media presentation is the combination of the content in the broadcast video 310 for an event (e.g., a sporting event) or a particular timeslot in a broadcast schedule (e.g., a one hour timeslot).

The keyer 315 combines the broadcast video 310 with the overlay video 175. In one embodiment, the broadcast video 310 and overlay video 175 are video streams transmitted to the keyer 315 which combines the video streams using a transparency key 325 provided by the graphics generator 160. In one embodiment, the overlay video 175 is divided logically into fill data (which contains the content of the overlay system such as the color of each pixel that forms the graphics or animations) and the transparency key 325 which controls how pronounced the graphics are when overlaid on the broadcast video 310. For example, if a pixel in the overlay video 175 is not part of the desired graphic or animation, the graphics generator 160 may assign a low transparency value for the pixel in the transparency key 325. Conversely, if the pixel is part of the graphic or animation, the graphics generator 160 assigns a high transparency value (i.e., the pixel is opaque and blocks the corresponding pixel in the media presentation). In this manner, the keyer 315 can use the fill data (e.g., the color and shade of the pixel) and the transparency key 325 to superimpose the frames of the overlay video 175 onto the frames of the broadcast video 310 and generate a combined video stream.

The broadcast network 320 broadcasts the combined broadcast video 310 and the overlay video 175 received from the keyer 315. In one embodiment, the broadcast network 320 includes a plurality of television stations or cable networks that broadcast the combined video stream. The broadcast network 320 may include fiber optical, cable, or satellite transmission means for receiving and distributing the combined video stream. Moreover, the broadcast network 320 may include wired or wireless transmitters, e.g., antennas or cables, for broadcasting the combined video stream to viewers. In one example, the broadcast network 320 may use the Internet to stream the combined video stream to viewers.

Although the embodiments above describe broadcasting the media presentation, this disclosure is not limited to such. Other embodiments can be used with video on demand where the media presentation is transmitted in response to a user request. For example, when a user requests the media presentation, the keyer 315 receives the corresponding video from the video content playout 305 which is combined with the overlay video 175 from the graphics generator 160. In this scenario, the broadcast network 320 may include a cable network or a portion of the Internet which permits a viewer to request the media presentation. When using video on demand, the media presentation may not include promotional or commercial content. For example, the content provider may have removed the commercials from the show when preparing the media presentation. Nonetheless, the overlay video 175 may be used to add promotional content to the media presentation using the techniques described herein.

Although FIG. 5 illustrates combining the overlay video 175 and the broadcast video 310 at the keyer 315 before being transmitted to the viewer, in other embodiments, this combination is performed by a user device (e.g., a set-top box, head end device, or user computing device). For example, the graphics generator 160 may be an application executing on the user device such that when broadcast video 310 is received from the broadcast network 320, the graphics generator 160 queries a corresponding webpage and generates the overlay video 175. In one embodiment, the overlay video 175 can be customized for a particular viewer or geographic location. For example, the web server may store different webpages for different viewers, types or categories of viewers, or geographic locations which can be used to generate a customized overlay video 175. Once the broadcast video 310 and overlay video 175 are combined on the user device, the user device outputs the combined video for display.

Figure 4:
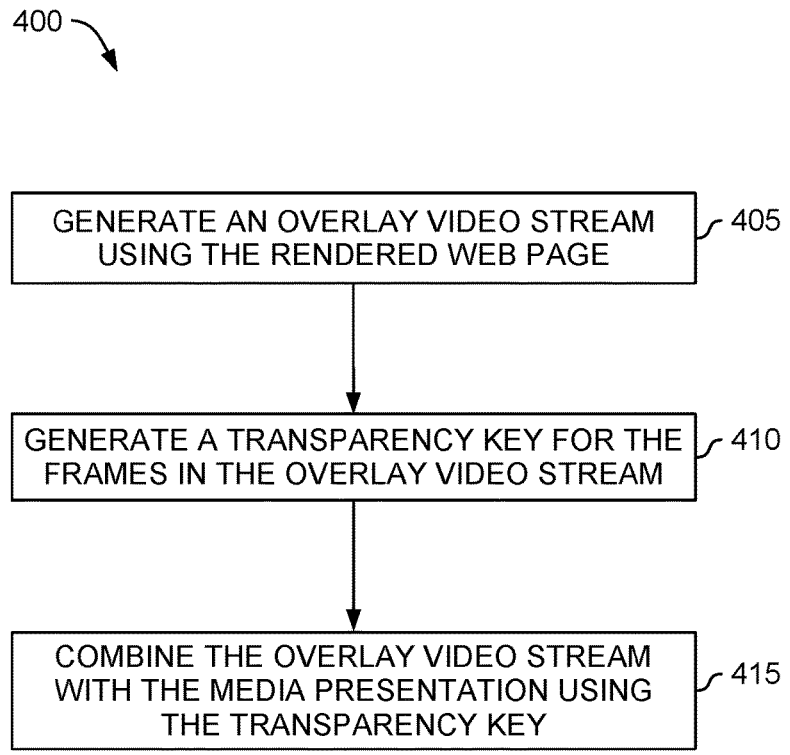
FIG. 4 is a flowchart for overlaying a graphics video stream with a broadcast video stream for a media presentation, according to one embodiment described herein.

FIG. 4 is a flowchart of a method 400 for overlaying a graphics video stream with a broadcast video for a media presentation, according to one embodiment described herein. At block 405, the graphics generator generates an overlay video stream using the rendered webpage (i.e., the displayable image). In one embodiment, the rendered webpage is stored in a buffer which the graphics generator copies to generate each frame of the overlay video stream. For example, by outputting a copy of the rendered webpage sixty times a second, the graphics generator can create a 60 Hz high-definition overlay video stream. If the webpage is updated, a new rendered version of the webpage is stored in the buffer which the graphics generator copies to output the overlay video stream.

At block 410, the graphics generator generates a transparency key for the frames in the overlay video stream. In one embodiment, the transparency key provides a transparency value for each pixel (or a group of pixels) in the frames of the overlay video which determines the opacity of the pixels. Generally, the less transparent the pixels in the overlay video, the more these pixels occlude the pixels in the media presentation. Conversely, the more transparent the pixels in the overlay video, the less these pixels occlude the media presentation. Thus, the graphics generator assigns greater transparency values to the pixels that include the graphics or animations in the webpage but lower transparency values for the other portions of the webpage. That way, when combined with the broadcast video, the graphics and animations are visible while the remaining portions of the rendered webpage are not. Of course, it may be desired that the overlay graphics and/or animations or somewhat transparent so that the corresponding parts of the media presentation are still visible. In those instances, the graphics generator may reduce the transparency value so that the graphics in the webpage do not completely occlude the corresponding portions in the media presentation.

In one embodiment, the graphics generator sets the transparency value based on user parameters or a timing guide. For example, the user may want the graphics to fade in and out. Thus, the graphics generator may change the transparency value for the pixels in each frame of the overlay video so that the graphics appear slowly over time or gradually disappear from the media presentation. Or the user may want the opacity of the graphics in the overlay video to change depending on the content in the media presentation. Thus, for each frame, the graphics generator may alter the transparency value depending on whether the media presentation is currently displaying commercial or promotional content versus when the presentation is displaying program content.

Alternatively or additionally, the web designer may set the transparency values for the pixels (or groups of pixels) when designing the webpage. For example, the designer may indicate what portions of the webpage are background (and thus, should be see through) and which portions include graphics or animations that should be visible. The graphics generator may use these transparency values to define the transparency key or alter the values using any of the factors described above.

At block 415, the keyer combines the overlay video stream with the broadcast video for the media presentation using the transparency key. In one embodiment, the keyer performs a pixel-by-pixel combination where the pixel of the media presentation is mixed with the corresponding pixel in the overlay video using the fill data and transparency key. The amount that the color of the pixel of the overlay video occludes the pixel of the media presentation depends on the transparency key. The more transparent the pixel in the overlay video, the less the pixel of the overlay video stream occludes the corresponding pixel in the media presentation.

In one embodiment, the size of the frames in the overlay video is the same size as the frames in the broadcast video of the media presentation. Put differently, the overlay video may have the same resolution as the broadcast video such that there is a one-to-one pixel correspondence between each frame of the videos. However, this is not a requirement. In other embodiments, the frames of the overlay video may have less pixels or smaller dimensions than the frames of the broadcast video. In such a scenario, the graphics generator may indicate to the keyer where the graphics in the overlay video should be overlaid on the broadcast video. For example, the graphics generator may indicate that the frames of the overlay video should be centered in the lower third of the frames of the broadcast video. With this information, the keyer can insert the graphics in the overlay video into the correct location within the broadcast video (using the transparency key and fill data).

In one embodiment, the keyer combines the overlay video with the broadcast video in response to a command from a director or producer of the broadcast. For example, the director may be in control room and instruct the keyer when to overlay the broadcast video with the graphics in the overlay video and when not to combine the videos. In this manner the director can selectively control when the keyer adds the graphics to the broadcast video. In one example, an automated program, rather than the director, may add the graphics during to the broadcast video during predefined intervals (e.g., every five minutes) but not during commercials.

FIG. 5 illustrates overlaying a frame 510 of a broadcast video stream with a frame 505 of a graphics video stream, according to one embodiment described herein. In this example, the broadcast video frame 510 illustrates a live event (i.e., a sporting event) at one moment in time. Although the frames of the broadcast video may be streamed to a keyer as the frames are captured in real-time, in other embodiments the broadcast video may have been pre-recorded.

The overlay video frame 505 illustrates one frame provided by the graphics generator after rendering a webpage as described above. For example, the frame 505 may represent a copy of the rendered webpage that was stored in a buffer and outputted at a desired frame rate (e.g., 60 frames per second) to generate the overlay video. In this embodiment, the dimensions or size of the overlay video frame 505 is the same as the broadcast video frame 510. As such, each pixel in the overlay video frame 505 corresponds to exactly one of the pixels in the broadcast video frame 510.

The overlay video frame 505 includes a transparent portion 515 and a graphic 520. In one embodiment, the web designer may have indicated that the transparent portion 515 is a clear background which means that the pixels in the portion 515 should be given transparency values that make these pixels substantially see through. Conversely, the pixels forming the graphic 520 are given different transparency values so that the pixels can occlude (at least partially) the pixels in the broadcast video frame 510.

The graphic 520 includes dynamic content 525 which can change over time automatically (i.e., without user input). For example, the webpage may include a link to a data server which provides updated scores that changes the dynamic content 525 in the graphic 520. Once rendered by the graphics generator, the new values for the dynamic content 525 are displayed in the graphic 520. Other parts of the graphic 520, however, may be static content that does not change without user input. For example, the color of the graphic 520 or its title may remain constant until the web designer changes the data in the webpage.

Arrow 535 illustrates combining the overlay video frame 505 with the broadcast video frame 510. Because of the transparency values for the transparent portion 515, the pixels in the portion 515 do not occlude the corresponding portion in the broadcast video. Thus, everything in the corresponding portion of the broadcast video frame 510 is still viewable to the user in the combined frame 530. Conversely, the transparency values for the graphic 520 inform the keyer that the corresponding portion in the broadcast video frame 510 should be occluded by the pixels in the graphic 520. As such, the graphic 520 is viewable to the user in the combined frame 530 but the pixels of the broadcast video frame 510 are not. That is, if the pixels in the graphic 520 are completely non-transparent, then all of the elements in the broadcast video at the location of the graphic 520 are not viewable to the user. The keyer can then transmit the combined frame 530 to a broadcast network which distributes the media presentation that now includes the graphic 520 to one or more viewers.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to apply video stream overlays using transparency keys based on content type, the computer-implemented method comprising:
    connecting to a web server storing multiple webpages comprising different graphics to be overlaid on one or more media video streams, wherein a location of each webpage is defined by a respective uniform resource locator (URL);
    requesting a webpage from the multiple webpages using a URL, wherein the webpage is requested by an overlay system operatively connected to a communication network, the overlay system having a plurality of components including a graphics generator, a playout component, and a keyer component;
    receiving the webpage from the web server, the webpage comprising at least one graphic to be overlaid on a media video stream of a specified content type;
    rendering the webpage into a displayable image comprising the at least one graphic, wherein the webpage is rendered by the graphics generator;
    generating an overlay video stream using the displayable image; and
    generating a transparency key by the graphics generator when executed by one or more computing processors, wherein the transparency key defines transparency values indicating an opacity of pixels in the overlay video stream when overlaid on corresponding pixels in the media video stream, wherein the transparency values are determined based at least in part on the specified content type of the media video stream;

transmitting the transparency key to the keyer component, whereupon the keyer component receives the media video stream from the playout component, receives the overlay video stream from graphics generator, and generates a combined video stream by combining the overlay and media video streams based on the transparency key, whereafter the combined video stream is output via the communication network.

2. The computer-implemented method of claim 1, wherein the at least one graphic occludes at least a portion of the pixels in the media video stream.

3. The computer-implemented method of claim 2, wherein the displayable image comprises a transparent portion, wherein the transparency key indicates that the pixels of the overlay video stream in the transparent portion do not occlude corresponding pixels in the media video stream when the keyer component combines the overlay video stream and the media video stream.

4. The computer-implemented method of claim 2, further comprising:
receiving, from the web server, updates to the webpage, wherein the at least one graphic comprises dynamic content that is automatically updated by the web server.

5. The computer-implemented method of claim 1, wherein generating the overlay video stream using the displayable image comprises:
retrieving the displayable image from a buffer; and
outputting a copy of the displayable image periodically to satisfy a predetermined frame rate of the overlay video stream.

6. The computer-implemented method of claim 1, wherein the computer-implemented method is performed prior to displaying the overlay video stream, wherein the transparency key comprises a first transparency key, wherein the media video stream comprises a first media video stream, wherein the computer-implemented method further comprises:
generating a second transparency key defining transparency values indicating an opacity of pixels in the overlay video stream when overlaid on corresponding pixels in a second media video stream, wherein the transparency values are determined based at least in part on a specified content type of the second media video stream, different than the specified content type of the first media video stream.

7. The computer-implemented method of claim 6, wherein the first content type comprises a program content type, wherein the second content type comprises a promotional content type, wherein the transparency values determined for the promotional content type are higher than the transparency values determined for the program content type, wherein the at least one graphic occludes at least a portion of the pixels in the first media video stream.

8. The computer-implemented method of claim 7, wherein the displayable image comprises a transparent portion, wherein the first transparency key indicates that the pixels of the overlay video stream in the transparent portion do not occlude corresponding pixels in the first media video stream when the keyer component combines the overlay video stream and the first media video stream.

9. The computer-implemented method of claim 8, further comprising:
receiving, from the web server, updates to the webpage, wherein the at least one graphic comprises dynamic content that is automatically updated by the web server; and
in response to receiving updates:
re-rendering the webpage to generate a new displayable image containing the dynamic content; and
generating the overlay video stream using the new displayable image.

10. The computer-implemented method of claim 9, wherein generating the overlay video stream using the displayable image comprises:
retrieving the displayable image from a buffer; and
outputting a copy of the displayable image periodically to satisfy a predetermined frame rate of the overlay video stream.

11. The computer-implemented method of claim 10, wherein a total number of pixels in each frame of the overlay video stream is the same as a total number of pixels in each frame of the first media video stream;
wherein the communication network comprises a first communication network that is an external network, wherein the webpage is received via a second communication network that is an internal network, wherein the external network comprises a broadcast network, wherein the combined video stream comprises video on demand;
wherein the first media video stream is retrieved from an asset management system operatively connected to the overlay system via the internal network, wherein the combined video stream is generated based further on a broadcast schedule, wherein the broadcast schedule is dynamically modifiable based on one or more live event types.

12. A system to apply video stream overlays using transparency keys based on content type, the system comprising:
one or more computing processors; and
a memory comprising a program that, when executed by the one or more computer processors, performs an operation comprising:
connecting to a web server storing multiple webpages comprising different graphics to be overlaid on one or more media video streams, wherein a location of each webpage is defined by a respective uniform resource locator (URL);
requesting a webpage from the multiple webpages using a URL, wherein the system is operatively connected to a communication network, the system having a plurality of components including a graphics generator, a playout component, and a keyer component;
receiving the webpage from the web server, the webpage comprising at least one graphic to be overlaid on a media video stream of a specified content type;
rendering the webpage into a displayable image comprising the at least one graphic, wherein the webpage is rendered by the graphics generator;
generating an overlay video stream using the displayable image; and
generating a transparency key by the graphics generator, wherein the transparency key defines transparency values indicating an opacity of pixels in the overlay video stream when overlaid on corresponding pixels in the media video stream, wherein the transparency values are determined based at least in part on the specified content type of the media video stream;
transmitting the transparency key to the keyer component, whereupon the keyer component receives the media video stream from the playout component, receives the overlay video stream from graphics generator, and generates a combined video stream by combining the overlay and media video streams based on the transparency key, whereafter the combined video stream is output via the communication network.

13. The system of claim 12, wherein the at least one graphic occludes at least a portion of the pixels in the media video stream.

14. The system of claim 13, wherein the displayable image comprises a transparent portion, wherein the transparency key indicates that the pixels of the overlay video stream in the transparent portion do not occlude corresponding pixels in the media video stream when the keyer component combines the overlay video stream and the media video stream.

15. The system of claim 13, the operation further comprising:
receiving, from the web server, updates to the webpage, wherein the at least one graphic comprises dynamic content that is automatically updated by the web server.

16. The system of claim 12, wherein generating the overlay video stream using the displayable image comprises:
retrieving the displayable image from a buffer; and
outputting a copy of the displayable image periodically to satisfy a predetermined frame rate of the overlay video stream.

17. A non-transitory computer-readable medium to apply video stream overlays using transparency keys based on content type, the non-transitory computer-readable medium comprising:
computer-readable program code that, when executed by a computing processor, performs an operation comprising:
connecting to a web server storing multiple webpages comprising different graphics to be overlaid on one or more media video streams, wherein a location of each webpage is defined by a respective uniform resource locator (URL);
requesting a webpage from the multiple webpages using a URL, wherein the webpage is requested by an overlay system operatively connected to a communication network, the overlay system having a plurality of components including a graphics generator, a playout component, and a keyer component;
receiving the webpage from the web server, the webpage comprising at least one graphic to be overlaid on a media video stream of a specified content type;
rendering the webpage into a displayable image comprising the at least one graphic, wherein the webpage is rendered by the graphics generator;
generating an overlay video stream using the displayable image; and
generating a transparency key by the graphics generator, wherein the transparency key defines transparency values indicating an opacity of pixels in the overlay video stream when overlaid corresponding pixels in the media video stream, wherein the transparency values are determined based at least in part on the specified content type of the media video stream;
transmitting the transparency key to the keyer component, whereupon the keyer component receives the media video stream from the playout component, receives the overlay video stream from graphics generator, and generates a combined video stream by combining the overlay and media video streams based on the transparency key, whereafter the combined video stream is output via the communication network.

18. The non-transitory computer-readable medium of claim 17, wherein the at least one graphic occludes at least a portion of the pixels in the media video stream.

19. The non-transitory computer-readable medium of claim 18, wherein the displayable image comprises a transparent portion, wherein the transparency key indicates that the pixels of the overlay video stream in the transparent portion do not occlude corresponding pixels in the media video stream when the keyer component combines the overlay video stream and the media video stream.

20. The non-transitory computer-readable medium of claim 18, the operation further comprising:
receiving, from the web server, updates to the webpage, wherein the at least one graphic comprises dynamic content that is automatically updated by the web server.

* * * * *